United States Patent
Iida et al.

(10) Patent No.: US 10,923,698 B2
(45) Date of Patent: Feb. 16, 2021

(54) LAMINATE-TYPE POWER STORAGE ELEMENT

(71) Applicant: FDK CORPORATION, Tokyo (JP)

(72) Inventors: Yuya Iida, Tokyo (JP); Yasuaki Egawa, Tokyo (JP); Daisuke Hirata, Tokyo (JP); Ryuji Ito, Tokyo (JP); Akihiro Yamamoto, Tokyo (JP)

(73) Assignee: FDK CORPORATION, Tokyo (JP)

( * ) Notice: Subject to any disclaimer, the term of this patent is extended or adjusted under 35 U.S.C. 154(b) by 280 days.

(21) Appl. No.: 15/983,070

(22) Filed: May 17, 2018

(65) Prior Publication Data
US 2018/0337382 A1 Nov. 22, 2018

(30) Foreign Application Priority Data
May 19, 2017 (JP) .............................. JP2017-099490

(51) Int. Cl.
*H01M 2/08* (2006.01)
*H01M 6/16* (2006.01)
(Continued)

(52) U.S. Cl.
CPC ....... *H01M 2/1653* (2013.01); *H01M 2/0207* (2013.01); *H01M 2/0275* (2013.01);
(Continued)

(58) Field of Classification Search
CPC ............. H01M 2/16; H01M 10/0525; H01M 10/0585; H01M 2/02; H01M 2/08;
(Continued)

(56) References Cited

U.S. PATENT DOCUMENTS

| | | | | |
|---|---|---|---|---|
| 6,632,538 B1 * | 10/2003 | Yamazaki | ............. | H01M 2/021 428/213 |
| 2006/0204839 A1 * | 9/2006 | Richards | ................. | H01M 4/66 429/137 |

(Continued)

FOREIGN PATENT DOCUMENTS

| | | |
|---|---|---|
| JP | 2013020769 A | 1/2013 |
| JP | 2014026986 A | 2/2014 |
| WO | 2014021291 A1 | 2/2014 |

OTHER PUBLICATIONS

FDK Corporation, "Thin Type Primary Lithium Batteries", searched on Apr. 24, 2017, Japanese Website: <http://www.fdk.co.jp/battery/lithium/lithium_thin.html>; English Website: <http://www.fdk.com/battery/lithium_e/lithium_thin.html>.

*Primary Examiner* — Alexander Usyatinsky
(74) *Attorney, Agent, or Firm* — Isshiki International Law Office; Joseph P. Farrar (57) ABSTRACT

A laminate-type power storage element includes a flat plate-shaped electrode body and an exterior body. The electrode body is configured by stacking a sheet-shaped positive electrode and a sheet-shaped negative electrode on either side of a separator. The exterior body is formed in a flattened bag-shape by thermocompression bonding peripheral edge regions of two opposing laminated films, to seal the electrode body inside the flattened bag-shape of the exterior body together with an electrolyte. The separator has a sheet-shaped substrate and at least one bonding layer formed on at least one surface of the substrate. A peripheral edge portion of the separator is sandwiched between and bonded by the two laminated films at a peripheral inside of the peripheral edge regions of the two laminated films.

2 Claims, 5 Drawing Sheets

(51) Int. Cl.
*H01M 2/16* (2006.01)
*H01M 10/0525* (2010.01)
*H01M 10/0585* (2010.01)
*H01M 2/02* (2006.01)
*H01M 10/42* (2006.01)

(52) U.S. Cl.
CPC ........... *H01M 2/0287* (2013.01); *H01M 2/08* (2013.01); *H01M 2/162* (2013.01); *H01M 2/1686* (2013.01); *H01M 6/16* (2013.01); *H01M 10/0525* (2013.01); *H01M 10/0585* (2013.01); *H01M 10/4235* (2013.01); *H01M 2220/30* (2013.01)

(58) Field of Classification Search
CPC .... H01M 6/16; H01M 2/1653; H01M 2/0207; H01M 2/0275; H01M 2/0287; H01M 2/162; H01M 2/1686; H01M 2220/30; H01M 10/4235
See application file for complete search history.

(56) References Cited

U.S. PATENT DOCUMENTS

| | | | |
|---|---|---|---|
| 2007/0218355 A1* | 9/2007 | Ryu | H01M 2/18 429/152 |
| 2011/0008665 A1* | 1/2011 | Yoon | H01M 2/0265 429/120 |
| 2011/0076544 A1* | 3/2011 | Maeda | H01M 10/0585 429/136 |
| 2015/0179997 A1* | 6/2015 | Iwai | H01M 2/1653 429/145 |

* cited by examiner

LAMINATE-TYPE POWER STORAGE ELEMENT

CROSS-REFERENCE TO RELATED APPLICATION

The present application claims priority pursuant to 35 U.S.C. § 119 to Japanese Patent Application No. 2017-099490 filed on May 19, 2017 in the Japan Patent Office, the entire disclosure of which is hereby incorporated herein by reference.

BACKGROUND

Technical Field

The present disclosure relates to a laminate-type power storage element.

Background Art

Some electronic devices are extremely thin (also referred to below as thin-type electronic devices) while still including an in-built power source, such as IC cards incorporating one-time password functionality and a display, IC cards with an attached display, and tags and tokens (one-time password generators). Laminate-type power storage elements that are appropriate for downsizing and thinning are often employed as power sources in such thin-type electronic devices.

SUMMARY

Figure 1A:
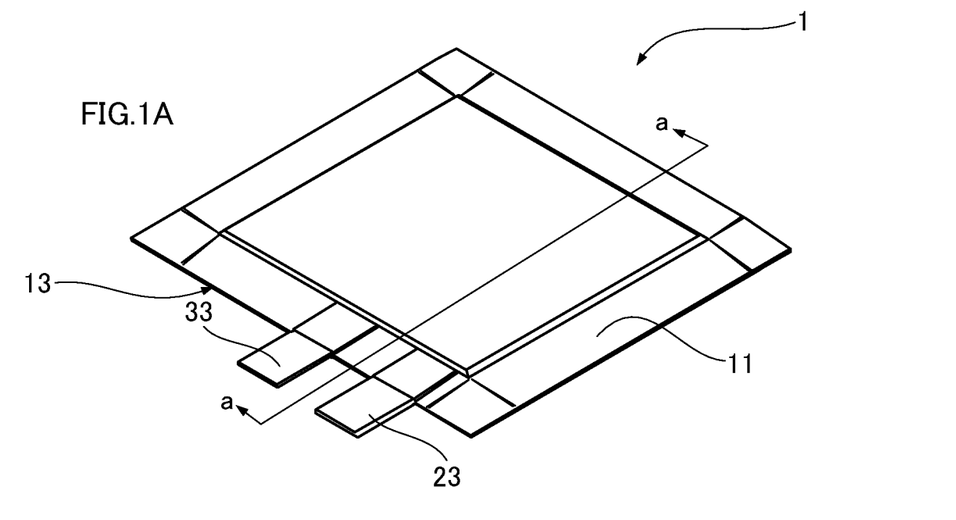
FIG. 1A is a diagram illustrating an example of a laminate-type power storage element.
Figure 1B:
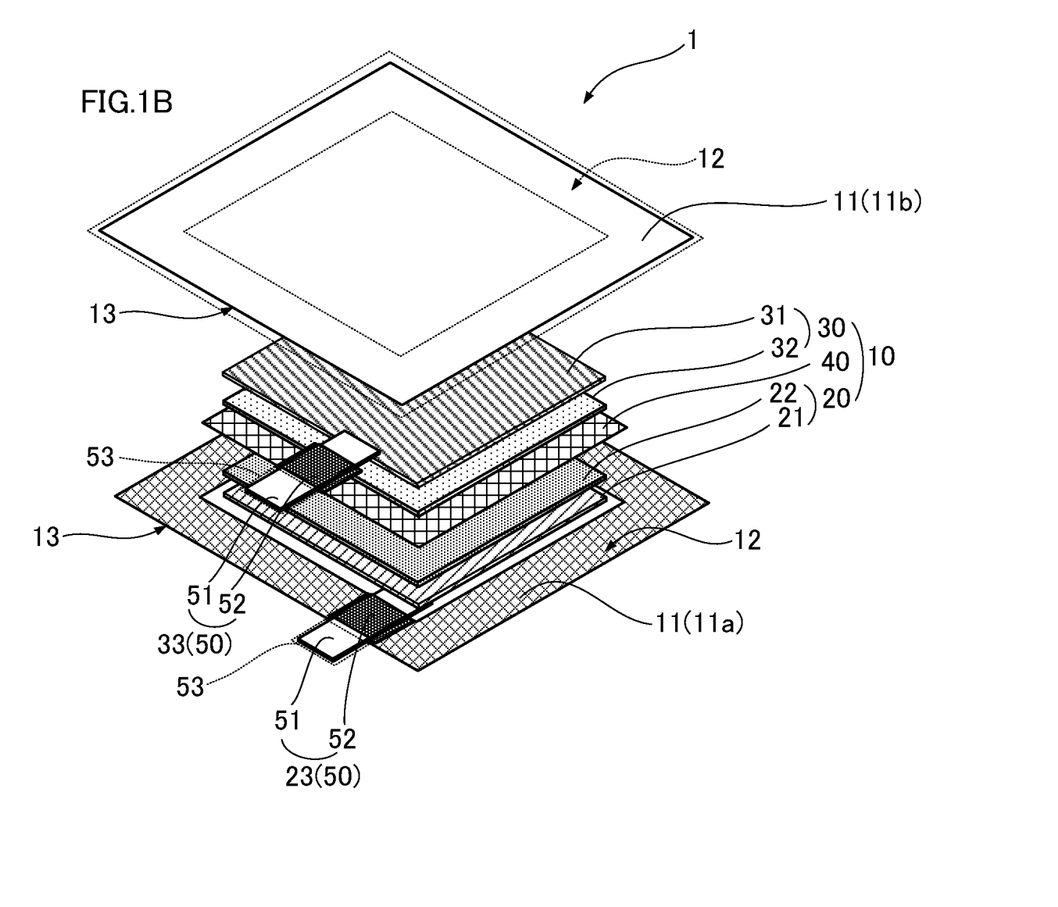
FIG. 1B is a diagram illustrating an example of a laminate-type power storage element.

A laminate-type power storage element 1 is illustrated in FIGS. 1A and 1B. FIG. 1A illustrates the external appearance of a laminate-type power storage element 1. FIG. 1B is an exploded perspective view illustrating an example of an internal structure of the laminate-type power storage element 1. Hatching is applied to some of the members and locations in FIG. 1B, to facilitate discrimination from other members and locations.

As illustrated in FIG. 1A, the laminate-type power storage element 1 has a flat plate-shaped appearance, and includes a power generation element sealed inside a flattened bag-shaped exterior body 11 formed of laminated films 11a and 11b (shown in FIG. 1B). In the laminate-type power storage element 1 illustrated in FIG. 1A and FIG. 1B, a positive electrode terminal plate 23 and a negative electrode terminal plate 33 protrude from one side 13 of the rectangular exterior body 11.

As illustrated in FIG. 1B, an electrode body 10 is configured from a sheet-shaped positive electrode 20 and a sheet-shaped negative electrode 30 stacked on either side of a separator 40. The electrode body 10 is encapsulated, together with an electrolyte, inside the exterior body 11. The positive electrode 20 is configured from a positive electrode material 22 that contains a positive electrode active substance and is arranged on one main face of a positive electrode current collector 21 made from a metal sheet or a metal foil. The negative electrode 30 is configured from a negative electrode material 32 that contains a negative electrode active substance and is arranged on one main face of a negative electrode current collector 31 made from a metal sheet, a metal foil, or the like. The electrode body 10 is an integrated body formed by pressure bonding a stacked body configured by the positive electrode 20 and the negative electrode 30 stacked so that their electrode materials 22, 32 oppose each other via the separator 40.

The exterior body 11 has a sealed interior formed by superimposing two rectangular sheets of aluminum laminated film 11a, 11b, and then welding the two sheets together by using a thermocompression bonding method along peripheral edge regions 12 of the aluminum laminated films 11a, 11b. In FIG. 1B, the peripheral edge region 12 of the laminated film 11b is illustrated by a frame of broken lines, and the peripheral edge region 12 of the laminated film 11a is illustrated by mesh hatching. The laminated films 11a, 11b have a stacked structure of one or more layers of resin disposed on the front and back faces of a substrate formed from a metal foil (aluminum foil, stainless steel foil). Generally, the laminated films have a stacked structure including a protection layer made, for example, from a polyamide resin or the like disposed on one face, and a bonding layer, having heat welding properties and made, for example, from polypropylene or the like, disposed on the other face.

A procedure will now be described for molding the two sheets of laminated film 11a, 11b into the flattened bag-shaped exterior body 11 and housing the electrode body 10 inside the exterior body 11. First, for example, the electrode body 10 is interposed between the two opposing laminated films 11a, 11b, which are sheets having rectangular planar shapes. The laminated films are then welded together on three sides to achieve a state in which the electrode body 10 is housed inside a bag that is open at the remaining un-welded side 13. Then, with the positive electrode terminal plate 23 and the negative electrode terminal plate 33 projecting outside the exterior body 11 through the one side 13, the peripheral edge regions 12 are welded together along the one side 13.

Note that a tab lead 50 is employed in the laminate-type power storage element 1 illustrated here for both the positive electrode terminal plate 23 and the negative electrode terminal plate 33. The tab lead 50 has a structure in which a tab film 52, which is sealant made from an insulating resin, is bonded to an intermediate portion in the long direction of a strip-shaped terminal lead 51 configured from a metal sheet, a metal foil, or the like, to hold the terminal lead 51. In the tab lead 50 configuring the positive electrode terminal plate 23, one end 53 of the terminal lead 51 is exposed outside the exterior body 11, and another end of the terminal lead 51 is connected to a portion of the positive electrode current collector 21 by a method such as ultrasound welding. Similarly, in the tab lead 50 configuring the negative electrode terminal plate 33, one end 53 of the terminal lead 51 is exposed outside the exterior body 11, and another end of the terminal lead 51 is connected to a portion of the negative electrode current collector 31 by a method such as ultrasound welding. Thus, the tab films 52 of the tab leads 50 are heat-welded together with the laminated films 11a, 11b at the predetermined one side 13 when the peripheral edge regions 12 of the two stacked sheets of laminated film 11a, 11b are thermocompression bonded.

Note that Japanese Unexamined Patent Application Publication No. 2013-20769 (referred to as Patent Literature 1 below), WO 2014/021291 (referred to as Patent Literature 2 below), and Japanese Unexamined Patent Application Publication No. 2014-26986 (referred to as Patent Literature 3 below) describe separators that are related to the present disclosure and have bonding layers formed on the surfaces thereof. Moreover, the characteristics, discharge performance, and the like of thin-type lithium batteries are described by FDK Corporation in "Thin-type lithium primary battery" online at the URL http://www.fdk.co.jp/battery/lithium/lithium_thin.html, in an Internet search of 24 Apr. 2017 (referred to as Non-Patent Literature 1 below).

Due to thin-type electronic devices being easily bent, good rigidity is demanded of the laminate-type power storage element 1 serving as a power source for such electronic devices. Battery performance and safety are obviously not greatly affected even when flexural stress is applied, as long as there is no damage to the electrode body 10 inside the exterior body 11. However, sometimes creases are generated in the exterior body 11 when a flat plate-shaped laminate-type power storage element 1 is bent. Creases in the exterior body 11 of the laminate-type power storage element 1 are thought to be generated by compressive stress being applied in a direction along the plane of the laminated films 11a, 11b configuring the exterior body 11.

Figure 2:
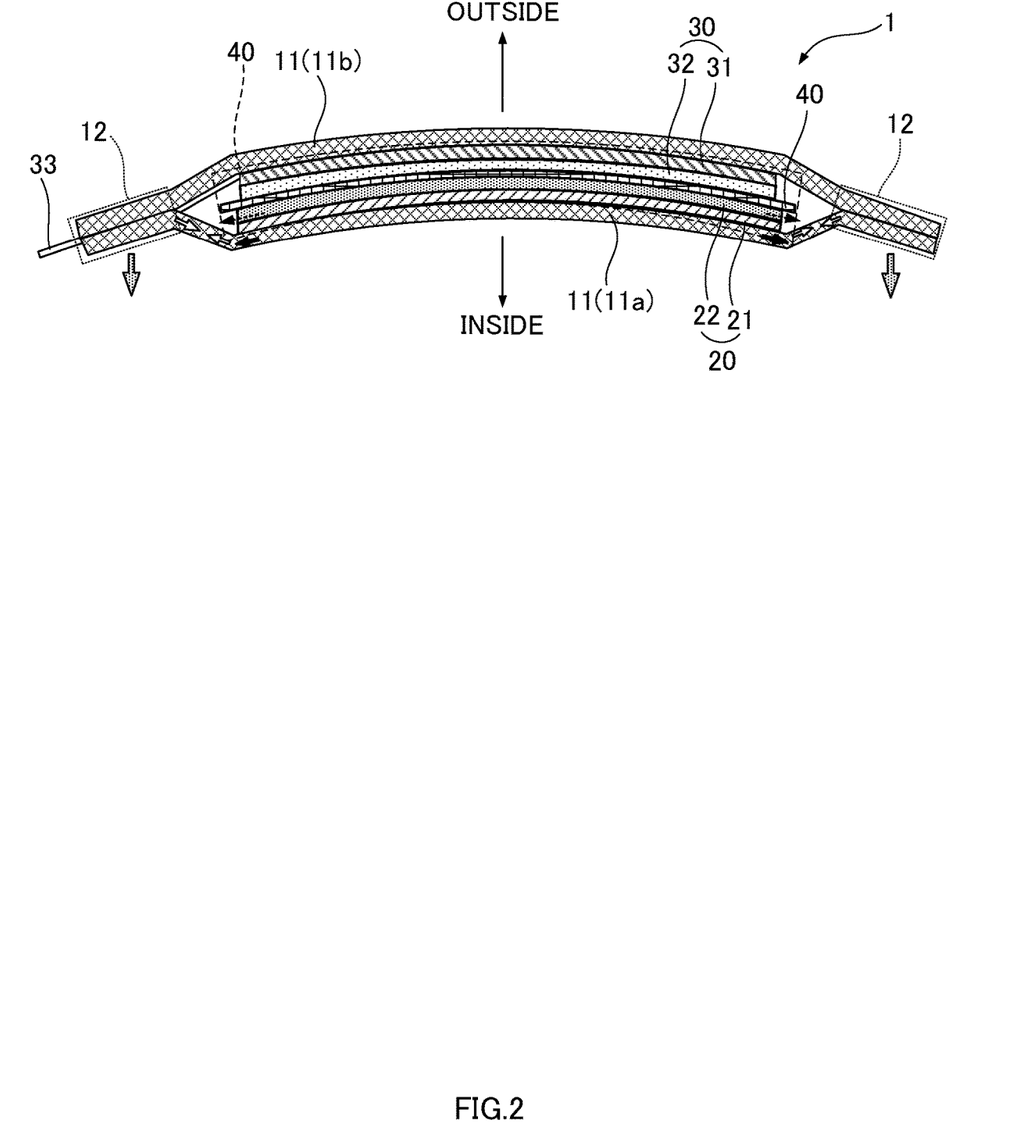
FIG. 2 is a diagram to explain a mechanism by which creases are generated in an exterior body of a laminate-type power storage element.

FIG. 2 illustrates an outline of a mechanism by which creases in the exterior body 11 are generated by bending. FIG. 2 is a cross-section corresponding along line a-a in FIG. 1A, and illustrates the laminate-type power storage element 1 bent by flexural stress. First, by applying stress to the laminate-type power storage element 1 in the direction illustrated by the dotted arrows in FIG. 2, the laminate-type power storage element 1 of this example bends so that the positive electrode 20 is on the inside and the negative electrode 30 is on the outside. When this happens, the two ends of the positive electrode 20 at the bend inside in FIG. 2 are displaced with respect to the separator 40 toward the peripheral edge region 12, as illustrated by the black arrows in FIG. 2. Then, the laminated film 11a is also pushed toward the peripheral edge region 12 by the displaced edges of the positive electrode 20. The two sheets of laminated film 11a, 11b in the exterior body 11 are fixed together at the heat-welded peripheral edge region 12, and are therefore not able to move relative to each other. This means that in-plane movement of the laminated film 11a, which is being pushed toward the peripheral edge region 12, is restricted by the inner peripheral edges of the peripheral edge region 12. Thus, a compressive stress is applied to the laminated film 11a in an in-plane direction as illustrated by the white arrows in FIG. 2, the surface of the laminated film 11a deforms in an irregular shape, and creases are generated. If creases are generated in the exterior body 11 of the laminate-type power storage element 1, the possibility arises that the thin-type electronic device that incorporates the laminate-type power storage element 1 may also deform.

When the laminate-type power storage element 1 is incorporated into an IC card, creases generated in the laminate-type power storage element 1 can cause problems. IC cards are formed from materials that enable the IC cards themselves to flex, and bend easily. Moreover, flexural stress is frequently applied to laminate-type power storage elements 1 incorporated into IC cards due to IC cards being carried around in a wallet or the like of a user. Namely, creases are more readily generated in laminate-type power storage elements 1 incorporated into IC cards than with laminate-type power storage elements 1 incorporated into other thin-type electronic devices. Due to IC cards being inserted into card slots when used in data reading devices, deformation of IC cards results in errors in data reading and writing, and in some cases the IC cards might no longer being insertable into card slots, or an inserted IC card cannot be removed.

Conceivably, a configuration having no separation between the peripheral edge region 12 of the exterior body 11 and the region of the exterior body 11 where the electrode body 10 is possible, to preemptively eliminate a region where creases might be generated. However, in such a configuration, the laminated films 11a, 11b and the electrode body 10 must be precisely aligned when the exterior body 11 is sealed, because any misalignment results in a portion of the electrode body 10 intruding into the peripheral edge region 12 during sealing. This gives rise to the possibility of liquid leakage due to insufficient sealing or insufficient sealing strength. Moreover, there would be a substantially right-angled step at the inner peripheral edges of the peripheral edge region 12 due to the presence of the electrode body 10, which is thicker than the laminated films 11a, 11b. A force in a direction to separate the two sheets of laminated film 11a, 11b would accordingly be continuously applied at the peripheral edge region 12. This would result in the possibility of sealing at the peripheral edge region 12 of the exterior body 11 being broken by impact or the like. In particular, in a laminate-type power storage element 1 that has a small surface area for use as a power source of an IC card, the surface area of the peripheral edge region 12 is also small. This means that there is an extremely tight permissible range for alignment error, and the sealing strength of the exterior body 11 is also smaller than that of other laminate-type power storage elements 1. Thus, in a small laminate-type power storage element 1, there is a greater need to provide some clearance between the peripheral edge region 12 and the electrode body 10.

Accordingly, there is a need for some form of configuration and structure of a laminate-type power storage element such that creases are less likely to be generated in the exterior body due to bending. Adopting such a configuration and structure should obviously not decrease the electrical performance of the laminate-type power storage element, nor increase the manufacturing costs thereof. An object of the disclosure is accordingly to provide a laminate-type power storage element in which creases are less likely to be generated in an exterior body by bending, while maintaining good electrical performance and competitive manufacturing costs.

In order to achieve the above objective, this disclosure provides an improved laminate-type power storage element including a flat plate-shaped electrode body and an exterior body. The flat plate-shaped electrode body has a sheet-shaped positive electrode and a sheet-shaped negative electrode stacked on either side of a separator. The exterior body is formed in a flattened bag-shape by thermocompression bonding peripheral edge regions of two opposing laminated films, and sealing the electrode body inside the flattened bag-shape of the exterior body together with an electrolyte. The separator has a sheet-shaped substrate and at least one bonding layer formed on at least one surface of the substrate. A peripheral edge portion of the separator is sandwiched between and bonded by the two laminated films at a peripheral inside of the peripheral edge regions of the two laminated films.

In the laminate-type power storage element described above, preferably the bonding layer is formed at only the peripheral edge portion of the separator. The substrate of the separator is may be a resin material having a porous structure and a predetermined melting point.

BRIEF DESCRIPTION OF DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof.

DESCRIPTION OF EMBODIMENTS

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, laminate-type power storage elements according to embodiments of the present disclosure are described. As used herein, the singular forms "a", "an", and "the" are intended to include the plural forms as well, unless the context clearly indicates otherwise.

EMBODIMENTS

Figure 3A:
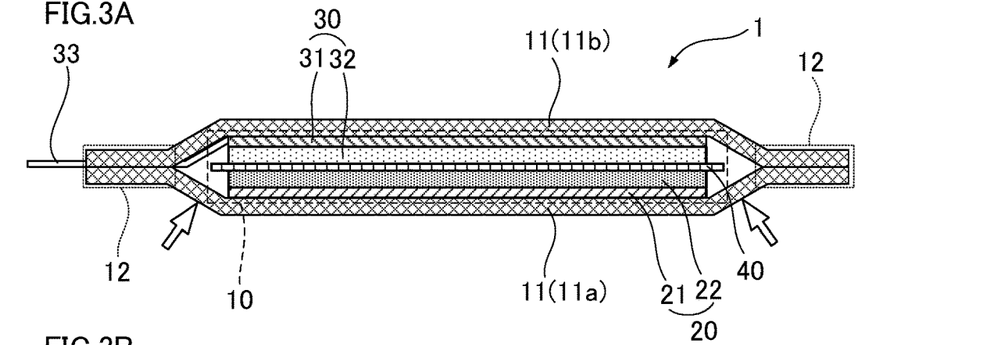
FIG. 3A is a diagram illustrating internal structure of a laminate-type power storage element.
Figure 3B:
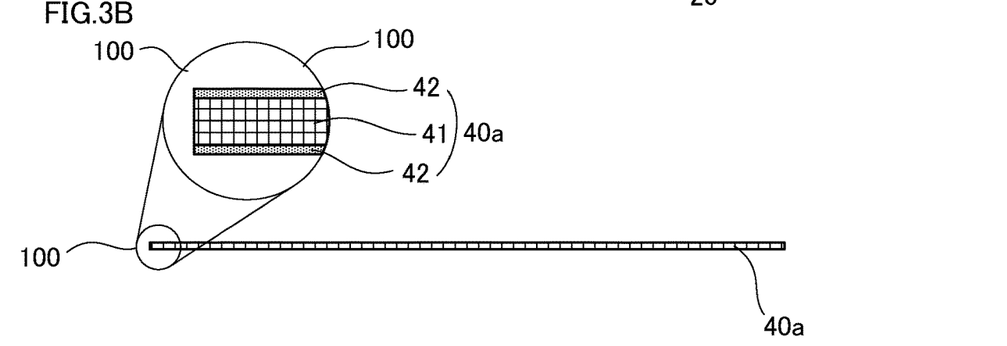
FIG. 3B is a diagram illustrating an internal structure of a laminate-type power storage element.
Figure 3C:
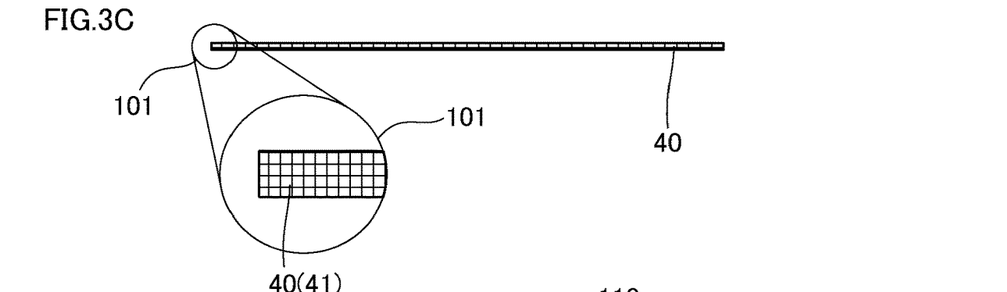
FIG. 3C is a diagram illustrating an internal structure of a laminate-type power storage element.
Figure 3D:
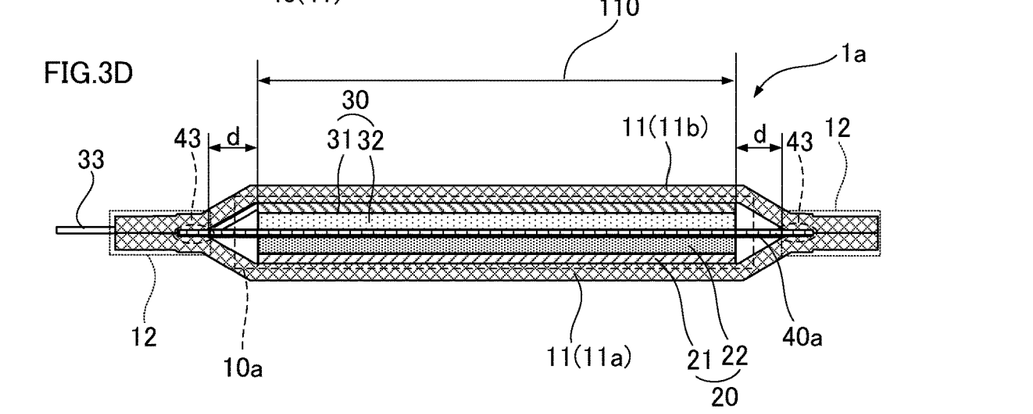
FIG. 3D is a diagram illustrating an internal structure of a laminate-type power storage element.

FIG. 3D illustrates the internal structure of a laminate-type power storage element 1a according to an embodiment of the present disclosure. In contrast, FIG. 3A is a cross-section illustrating the internal structure of the laminate-type power storage element 1 illustrated in FIG. 1. FIG. 3B is a cross-section illustrating a separator 40a employed in the laminate-type power storage element 1a according to an embodiment of the present disclosure. Similarly, FIG. 3C is a cross-section illustrating a structure of the separator 40 employed in the laminate-type power storage element 1.

As illustrated in FIG. 3D, the laminate-type power storage element 1a according to an embodiment of the present disclosure includes an electrode body 10a configured by a sheet-shaped positive electrode 20 and a sheet-shaped negative electrode 30 stacked on either side of the separator 40a. The electrode body 10a is encapsulated inside an exterior body 11, together with an electrolyte.

The external appearance and the basic configuration of the laminate-type power storage element 1a are similar to that of the laminate-type power storage element 1 illustrated in FIG. 1. However, the laminate-type power storage element 1a has a different structure for the separator 40a, and a different sealing structure for the exterior body 11, from those of the laminate-type power storage element 1 described above.

As illustrated in FIG. 3A, in the laminate-type power storage element 1, the positive electrode 20, the negative electrode 30, and the separator 40 configuring the electrode body 10 are all disposed to lie inside a peripheral edge region 12 of the exterior body 11. When flexural stress is applied to the laminate-type power storage element 1 so that, for example, the upper side of the page is bent outward, sometimes creases are generated at locations indicated by the white arrows in FIG. 3A, due to the mechanism described above.

Note that the separator 40 employed in the laminate-type power storage element 1 illustrated in FIG. 3C is configured of a substrate 41 alone, as illustrated in an enlarged view of the region indicated by circle 101.

In contrast, the laminate-type power storage element 1a according to an embodiment of the present disclosure employs the separator 40a having bonding layers 42 formed on both front and back faces of a sheet-shaped substrate 41, as illustrated in an enlarged view of the region indicated by circle 100 in FIG. 3B. The separator 40a is also dimensioned so that it would be capable of containing the separator 40 employed in the laminate-type power storage element 1. As a result, as illustrated in FIG. 3D, the laminate-type power storage element 1a has a sealing structure in which peripheral edges 43 of the separator 40a intrude into the peripheral edge region 12 of the exterior body 11, with the peripheral edges 43 being welded to the inner faces of laminated films 11a, 11b.

Having the peripheral edges 43 of the separator 40a fixed to the peripheral edge region 12 of the exterior body 11 as described above results in a robust configuration in which a distance d between ends of a region where the positive and negative electrodes 20, 30 are stacked in the electrode body 10 (also referred to below as a stacked portion 110) and the inner peripheral edges of the peripheral edge region 12 of the exterior body 11 varies little or not at all. Thus, tensional force, namely, force in a direction to stretch out any creases, is generated in a region between the peripheral edge region 12 and the stacked portion 110 of the electrode body 10 when the laminate-type power storage element 1a bends. This makes the generation of creases unlikely to occur in the exterior body 11.

Note that although each of the bonding layers 42 is formed over the entire face of the separator 40a employed in the laminate-type power storage element 1a according to an embodiment of the present disclosure, the region where the separator 40a actually contributes to bonding is only the peripheral edges 43 interposed between the peripheral edge regions 12 of the exterior body 11. When two sheets of laminated film 11a, 11b are superimposed on each other and thermocompression bonding is performed at the peripheral edge region 12 in order to obtain the above-described sealing structure for the laminate-type power storage element 1a according to the present embodiment, thermocompression bonding may be performed in a state in which the peripheral edges 43 of the separator 40a are sandwiched in a peripheral inside portion of the peripheral edge region 12.

Separators including bonding layers are described in Patent Literature 1 to 3. However, in the power storage elements described therein, the positive electrode and the negative electrode are each welded to the separator across the entire face of the electrode body. Moreover, in the power storage elements described in Patent Literature 1 to 3, in cases in which a combustible non-aqueous electrolyte is employed, such as in a lithium primary battery or a lithium secondary battery, a sheet of resin (for example, a polyolefin, polyethylene or the like) is employed as a substrate for the separator. Such a separator has a porous structure, and the resin melts at a predetermined temperature, to cause a shutdown effect. Thus, if the electrodes are welded to the separator by thermocompression bonding across the entire face of the electrode body, then there is a possibility of thermal shrinkage of the substrate of the separator, reducing the open surface area of the holes in the porous structure, or causing some of the holes to close. If the open surface area of the holes is reduced, or the holes are blocked, then ion conductivity between the positive electrode and the negative electrode via the electrolyte deteriorates, with the possibility of an increase in internal resistance.

To address this, samples were fabricated of not only the laminate-type power storage element 1a and the laminate-type power storage element 1, but also of a laminate-type power storage element 1b assembled by thermocompression bonding an electrode body 10b employing a separator 40b (described in detail later) that includes bonding layers 42. The internal resistance characteristics and resistance to bending were then investigated for each of the samples.

Performance Evaluation Tests

As described above, for the samples, the laminate-type power storage element 1a as illustrated in FIG. 3D was fabricated, and the laminate-type power storage elements 1, 1b were fabricated as comparative examples to the embodiment. The laminate-type power storage element 1 according to a first comparative example was fabricated corresponding to the laminate-type power storage element 1 illustrated in FIG. 1 and FIG. 3A, and the laminate-type power storage element 1b according to a second comparative example was fabricated that differed from the laminate-type power storage element 1 according to the first comparative example in that the separator 40b employed therein had bonding layers 42 formed on surfaces thereof.

Figure 4A:
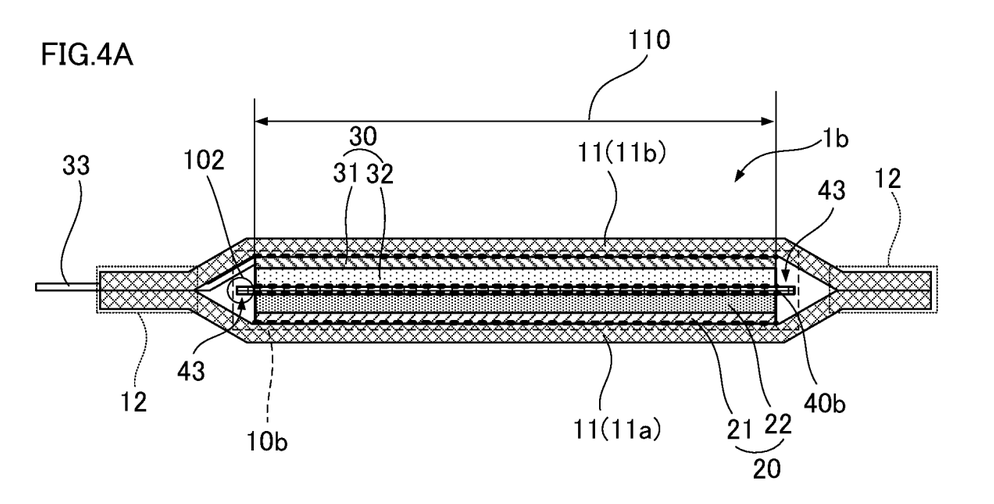
FIG. 4A is a diagram illustrating an internal structure of a laminate-type power storage element.
Figure 4B:
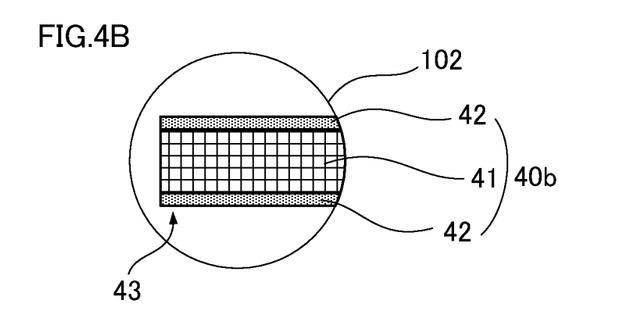
FIG. 4B is a diagram illustrating an internal structure of a laminate-type power storage element.

The laminate-type power storage element 1b according to the second comparative example is illustrated in FIG. 4A and FIG. 4B. FIG. 4A is a cross-section illustrating an internal structure of the laminate-type power storage element 1b according to the second comparative example. FIG. 4B is an enlargement of the area inside of circle 102 of FIG. 4A. The laminate-type power storage element 1b according to the second comparative example includes an electrode body 10b configured from a positive electrode 20 and a negative electrode 30 stacked on either side of the separator 40b and integrated into a single unit by thermocompression bonding. Moreover, similarly to the separator 40a, the separator 40b employed in the laminate-type power storage element 1b according to the second comparative example has bonding layers 42 formed on both the front and back face of a substrate 41. However, as illustrated in FIG. 4A, there are no regions where the peripheral edges 43 of the separator 40b and the peripheral edge region 12 of the exterior body 11 overlap. Thermocompression bonding is then performed at a region of the stacked portion 110 of the electrode body 10b. Inter-layer welding is performed (i.e., between a laminated film 11b and the negative electrode current collector 31, the negative electrode material 32 and the separator 40b, the laminated film 11a and the positive electrode current collector 21, and the positive electrode material 22 and the separator 40b, respectively) in the region illustrated by the central bold broken lines in FIG. 4A (i.e., the stacked portion 110 region).

Note that the laminate-type power storage element 1 according to the first comparative example has a configuration and structure substantially the same as that of the thin-type lithium battery described in Non-Patent Literature 1, except in its external size. The laminate-type power storage element 1a has a configuration, structure, and external size that are the same as those of the laminate-type power storage element 1 according to the first comparative example, except with respect to the structure of the separator 40a and with respect to the sealing structure thereof. The laminate-type power storage element 1b according to the second comparative example has a configuration, structure, and external size that are the same as those of the laminate-type power storage element 1 according to the first comparative example, except with respect to the structure of the separator 40b and with respect to the pressure bonding method of the electrode body 10b.

Figure 5:
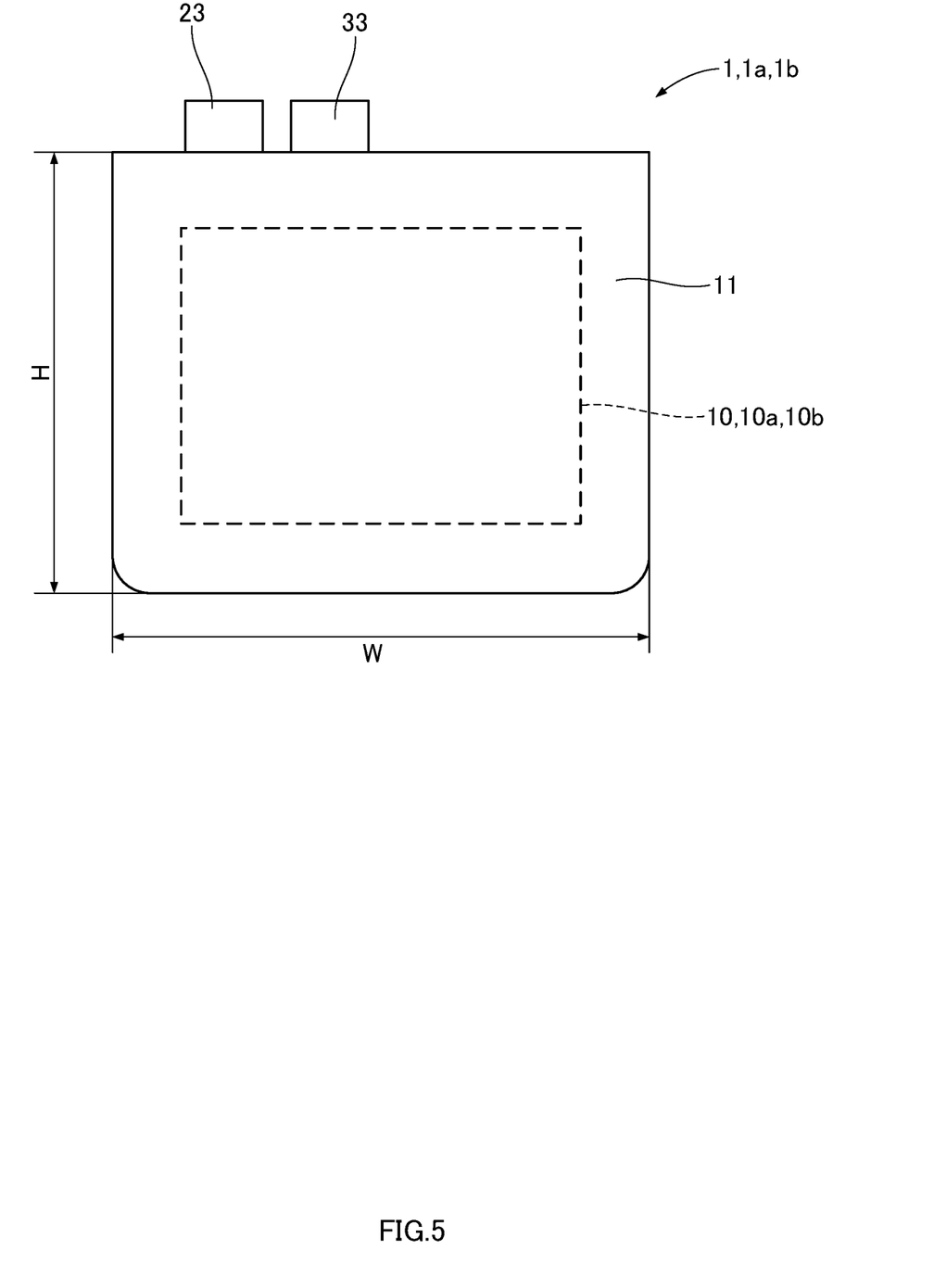
FIG. 5 is a diagram illustrating a planar shape of a lithium primary battery fabricated to evaluate characteristics of a laminate-type power storage element.

FIG. 5 illustrates the shape of the laminate-type power storage elements 1, 1a, 1b that were fabricated as samples. The samples 1, 1a, 1b each had a thickness of 0.5 mm at a thickest portion, where the electrode body 10, 10a, 10b was disposed. The rectangular exterior body 11 had a plan view size of a width W=39 mm and a height H=27 mm. Moreover, the separator 40a employed in the laminate-type power storage element 1a, and the separator 40b employed in the laminate-type power storage element 1b according to the second comparative example, both employed a porous film made from polyethylene as the substrate 41, and both had bonding layers 42 made from polyvinylidene fluoride formed on both the front and back faces thereof. The separator 40 in the laminate-type power storage element 1 according to the first comparative example was configured with only the porous film substrate 41 made from polyethylene, without bonding layers 42.

Moreover, in each of the laminate-type power storage element 1a, the laminate-type power storage element 1 according to the first comparative example, and the laminate-type power storage element 1b according to the second comparative example, the peripheral edge region 12 was thermocompression bonded for 30 seconds at a temperature of 120° C. and a pressure of 0.2 Mpa in a process to seal the exterior body 11. Moreover, in the laminate-type power storage element 1a, the peripheral edges 43 of the separator 40a were also heat-welded to the inner peripheral edges of the peripheral edge region 12 at the same time the peripheral edge region 12 of the exterior body 11 were sealed. In the laminate-type power storage element 1b according to the second comparative example, after the peripheral edge region 12 of the exterior body 11 had been thermocompression bonded, the region of the stacked portion 110 of the electrode body 10 was then also thermocompression bonded under the same conditions as the peripheral edge region 12. Obviously, the region where the electrode body 10 is disposed (the stacked portion 110) may be thermocompression bonded at the same time as the peripheral edge region 12 are bonded. Note that four samples of each of the laminate-type power storage elements 1, 1a, 1b were fabricated. The internal resistance was first measured for all the samples of the three types of laminate-type power storage elements 1, 1a, 1b having the configurations described above and the average values were found for each set of four samples. A bending test was then performed according to the procedure defined in IC Card Bending Characteristic Test Standard JIS X 6305-1(5.8), bending each of the laminate-type power storage elements 1, 1a, 1b 1000 times, and the generation of creases were investigated by observation.

The results of the internal resistance and bending tests for the laminate-type power storage elements 1, 1a, 1b are illustrated in the following Table 1.

TABLE 1

| Laminate-Type Power storage element | Internal Resistance | Bending Test |
|---|---|---|
| Embodiment (1a) | 110% | 0/4 |
| First Comparative Example (1) | 100% | 2/4 |
| Second Comparative Example (1b) | 300% | 0/4 |

In Table 1, the laminate-type power storage elements 1a, 1, 1b according to the embodiment, first comparative example, and second comparative example are shown as Embodiment, First Comparative Example, and Second Comparative Example, respectively. Relative values are shown for the internal resistances, with the laminate-type power storage element 1 according to the First Comparative Example set to 100%. The number of samples in which creases were generated, out of the four samples, is shown for the bending tests.

As is apparent from Table 1, the internal resistance of the laminate-type power storage element 1a was raised by about 10% with respect to that of the laminate-type power storage element 1 according to the first comparative example. This is hypothesized to be because, due to employing the separator 40a having the bonding layers 42 formed over the entire faces of the substrate 41 in the laminate-type power storage element 1a, the bonding layers 42 in the regions of the separator 40a facing the positive and negative electrodes 20, 30 act as slight resistance components. It is accordingly hypothesized that if a separator having the bonding layers 42 formed only at the peripheral edges 43 thereof were to be employed, then the internal resistance would be equivalent to that of the laminate-type power storage element 1 according to the first comparative example.

The laminate-type power storage element 1b according to the second comparative example employs the separator 40b having the bonding layers 42 formed similarly to in the laminate-type power storage element 1a. However, the separator 40b is thermocompression bonded to the positive electrode 20 and the negative electrode 30 in the region of the stacked portion 110 of the electrode body 10b. The internal resistance of the laminate-type power storage element 1b according to the second comparative example is three times that of the laminate-type power storage element 1 according to the first comparative example. This is hypothesized to be because the porous film configuring the substrate 41 of the separator 40b has shrunk due to the stacked portion 110 of the electrode body 10b being thermocompression bonded in the laminate-type power storage element 1b according to the second comparative example, and conduction paths have become blocked.

In bending tests, creases were generated in two out of four samples for the laminate-type power storage element 1 according to the first comparative example. Creases were not generated in even a single sample for the laminate-type power storage element 1b according to the second comparative example. This is hypothesized to be because, in the laminate-type power storage element 1b according to the second comparative example, even when bent there was no displacement of the electrodes 20, 30 with respect to the separator 40b, this being a cause of crease generation, due to the positive and negative electrodes 20, 30 being heat-welded to the separator 40b. Thus, creases were not generated in even a single sample, similarly to with the laminate-type power storage element 1a in which only the peripheral edges 43 of the separator 40a were heat-welded to the laminated films 11a, 11b. It can be confirmed from the above that the laminate-type power storage element 1a suppresses both an increase in internal resistance and generation of creases due to bending.

Other Examples, Other Advantageous Effects

In the separator 40a employed in the laminate-type power storage element 1a described above, the bonding layers 42 are formed on both the front and back faces of the substrate 41; however, a bonding layer 42 may be formed on just one face out of the front and back faces. The peripheral edges 43 of the separator 40a should intrude into a peripheral inside of the peripheral edge region 12 of the exterior body 11, and the peripheral edges 43 be welded to the inner faces of the laminated films 11a, 11b.

The laminate-type power storage element 1a according to the embodiment of the present disclosure is applicable to various power storage elements, irrespective of the method for electricity generation, and whether or not it is for a primary battery or a secondary battery, as long as the flat plate-shaped electrode body 10a is housed inside the flattened bag-shaped exterior body 11 formed from the laminated films 11a, 11b.

In fabricating the laminate-type power storage element 1a according to the embodiment of the present disclosure, thermocompression bonding is not performed on the electrode body 10a. Thus, even in cases in which the separator 40a has the capability to cause a shutdown effect, the laminate-type power storage element 1a does not lose such capability to cause a shutdown effect, the generation of creases can be suppressed, and an increase in the internal resistance can be suppressed. Obviously the laminate-type power storage element 1a may be one that does not employ a non-aqueous electrolyte, and employs a separator 40a with a non-woven fabric or the like as a substrate 41.

In the laminate-type power storage element 1a, a structure capable of suppressing the generation of creases in the exterior body 11 can be obtained by merely thermocompression bonding the peripheral edges 43 of the separator 40a at the same time as thermocompression bonding the peripheral edge region 12 of the rectangular exterior body 11. Moreover, thermocompression bonding of the electrode body 10a is not required. Thus, the laminate-type power storage element 1a of the present embodiment is equipped with a structure that lowers fabrication cost.

Moreover, due to the separator 40a and the positive and negative electrodes 20, 30 not being welded together at the stacked portion 110 of the electrode body 10 in the laminate-type power storage element 1a, an advantageous effect is obtained of damage to the electrode body 10 not being liable to occur due to excessive bending. Namely, if the stacked portion 110 of the electrode body 10 is welded to the separator 40a, then flexural stress is unavoidable, and deformation from bending in the electrodes 20, 30 occurs. This means that there is accordingly a possibility of the electrode material 22, 32 disposed on the electrode current collectors 21, 31 breaking or cracks appearing therein. However, the laminate-type power storage element 1a permits displacement due to bending of the electrodes 20, 30 with respect to the separator 40a. In the laminate-type power storage elements 1, 1b, such displacement causes creases. However, creases are not liable to be generated in the laminate-type power storage element 1a even if there is displacement of the electrodes 20, 30.

The laminate-type power storage element of the disclosure enables electrical performance and cost to be maintained, while suppressing the generation of creases in the exterior body due to bending. This means that in a thin-type electronic device having the laminate-type power storage element of the disclosure as a power source, the electrical performance and cost is maintained, while deformation is not liable to occur even under frequent application of flexural stress.

Although the present disclosure makes reference to specific embodiments, it is to be noted that the disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein.

What is claimed is:

1. A laminate-type power storage element comprising:
    a flat plate-shaped electrode body having a sheet-shaped positive electrode and a sheet-shaped negative electrode stacked on either side of a separator; and
    an exterior body, the exterior body being formed in a flattened bag-shape by thermocompression bonding peripheral edge regions of two opposing laminated films, and sealing the electrode body inside the flattened bag-shape of the exterior body together with an electrolyte,
    the separator having a sheet-shaped substrate and at least one bonding layer formed on a least a part of at least one of front and back faces of the sheet-shaped substrate,
    a peripheral edge portion of the separator being sandwiched between and bonded by the two laminated films at a peripheral inside of the peripheral edge regions of the two laminated films,
    the substrate of the separator being a resin material having a porous structure and a predetermined melting point,
    the positive electrode and the negative electrode and the separator not being welded together in the electrode body.

2. The laminate-type power storage element according to claim 1, wherein the bonding layer is formed at only the peripheral edge portion of the separator.

* * * * *